United States Patent
Chang

(10) Patent No.: US 11,551,021 B1
(45) Date of Patent: Jan. 10, 2023

(54) COUNTERFEIT PAPER CURRENCY DETECTOR WITH BARCODE READING FUNCTION

(71) Applicant: Top Vending Machine Electronics Co., Ltd., Taoyuan (TW)

(72) Inventor: Yuan-Fong Chang, Taoyuan (TW)

(73) Assignee: Top Vending Machine Electronics Co., Ltd., Taoyuan (TW)

( * ) Notice: Subject to any disclaimer, the term of this patent is extended or adjusted under 35 U.S.C. 154(b) by 0 days.

(21) Appl. No.: 17/496,974

(22) Filed: Oct. 8, 2021

(51) Int. Cl.
*G06K 7/14* (2006.01)
*G02B 6/42* (2006.01)

(52) U.S. Cl.
CPC ......... *G06K 7/1413* (2013.01); *G02B 6/4246* (2013.01)

(58) Field of Classification Search
CPC .... G06K 7/1413; G06K 7/14; G06K 7/10861; G06K 7/10; G02B 6/4246
USPC ............................................ 235/462.01, 454
See application file for complete search history.

(56) References Cited

U.S. PATENT DOCUMENTS

2004/0079906 A1* 4/2004 Balog ................. G07G 1/0018
250/556

* cited by examiner

*Primary Examiner* — Edwyn Labaze
(74) *Attorney, Agent, or Firm* — Alan D. Kamrath; Karin L. Williams; Mayer & Williams PC

(57) ABSTRACT

A counterfeit paper currency detector with a barcode reading function includes a casing unit receiving a delivering device, a driving device, a paper currency detection device, and a barcode reading device. The delivering device includes a passageway between an upper base and a lower base. The driving device drives a paper currency or a barcode sheet to pass through the passageway. When a paper currency passes through the passageway, a plurality of first paper currency detection units and a plurality of second paper currency detection units of the paper currency detection device examine whether the paper currency is genuine. When a barcode sheet passes through the passageway, a first reading module or a second reading module of the barcode reading device reads widths and spaces of a plurality of bars on the barcode sheet.

7 Claims, 12 Drawing Sheets

COUNTERFEIT PAPER CURRENCY DETECTOR WITH BARCODE READING FUNCTION

BACKGROUND OF THE INVENTION

The present invention relates to a counterfeit paper currency detector and, more particularly, to a counterfeit paper currency detector with a barcode reading function.

Counterfeit paper currency detectors and barcode readers are generally utilized for automatic business transaction. A typical counterfeit paper currency detector examines a paper currency by transmitting detecting light. When a driving device drives a paper currency to pass through a paper currency passageway, a detecting light transmitter and a detecting light receiver are used to examine whether the paper currency is genuine. A barcode reader is used to scan a one-dimensional barcode to read the widths and spaces between the black bars, thereby obtaining the information represented by the one-dimensional barcode.

However, the barcode reading method utilized by currently available barcode readers cannot be integrated into counterfeit paper currency detectors. Furthermore, the barcode readers and image sensors are expensive, rendering difficulties in cost reduction. Thus, a need exists for a novel counterfeit paper currency detector that mitigates and/or obviates the above drawbacks.

BRIEF SUMMARY OF THE INVENTION

An objective of the present invention is to provide a counterfeit paper currency detector including a paper currency examining function and a barcode reading function. A first reading module or a second reading module can be utilized to cooperate with lens and light guiding members to read the widths and spaces of bars on a face of a barcode sheet, thereby obtaining information represented by a one-dimensional barcode.

To achieve the above objective, a counterfeit paper currency detector with a barcode reading function according to the present invention comprises:

a casing unit including a casing and a front panel, wherein the front panel includes a paper currency inlet intercommunicating with an interior space of the front panel;

a delivering device received in the casing unit and including an upper base and a lower base, wherein a passageway is defined between the upper base and the lower base;

a driving device received in the casing unit, disposed on the lower base, and configured to drive a paper currency or a barcode sheet to pass through the paper currency inlet and the passageway;

a paper currency detection device received in the casing unit and including a first paper currency detection module and a second paper currency detection module, wherein the first paper currency detection module includes a first lens disposed on a bottom side of the upper base and a plurality of first paper currency detection units disposed in the upper base, wherein each of the plurality of first paper currency detection units extends downwards towards the first lens and the passageway, wherein the plurality of first paper currency detection units is electrically connected to a first circuit board, wherein the second paper currency detection module includes a second lens disposed on a top side of the lower base and a plurality of second paper currency detection units disposed in the lower base, wherein each of the plurality of second paper currency detection units extends upwards towards the second lens and the passageway, wherein the plurality of second paper currency detection units is electrically connected to a second circuit board, wherein when the paper currency passes through the passageway, each of the first paper currency detection units and each of the second paper currency detection units examine whether the paper currency is genuine; and a barcode reading device received in the casing unit and including a first reading module and a second reading module, wherein the first reading module includes a V-shaped first light guiding member, a first detecting light transmitter, and a first detecting light receiver, wherein the first light guiding member includes a first transmission guiding rod and a first reception guiding rod which are adjacent and at an angle to each other, wherein each of the first transmission guiding rod and the first reception guiding rod has an end integrally connected to a top side of the first lens, wherein a first light permeable portion is disposed to a bottom side of the first lens and is rectilinear, wherein the first detecting light transmitter and the first detecting light receiver are electrically connected to the first circuit board, wherein the first detecting light transmitter and the first detecting light receiver face another ends of the first transmission guiding rod and the first reception guiding rod, wherein the second reading module includes a V-shaped second light guiding member, a second detecting light transmitter, and a second detecting light receiver, wherein the second light guiding member includes a second transmission guiding rod and a second reception guiding rod which are adjacent and at an angle to each other, wherein each of the second transmission guiding rod and the second reception guiding rod has an end integrally connected to a bottom side of the second lens, wherein a second light permeable portion is disposed to a top side of the second lens and is rectilinear, wherein the second detecting light transmitter and the second detecting light receiver are electrically connected to the second circuit board, wherein the second detecting light transmitter and the second detecting light receiver face another ends of the second transmission guiding rod and the second reception guiding rod, wherein when the barcode sheet passes through the passageway, the first light permeable portion, the second light permeable portion, and a plurality of bars on the barcode sheet are perpendicular to a moving direction of the barcode sheet, wherein the first reading module or the second reading module reads a width of each of the plurality of bars and a space between each two adjacent bars.

In an example, the first reading module and the second reading module read two opposite sides of the barcode sheet, respectively.

In an example, the first detecting light transmitter emits a detecting light towards the first transmission guiding rod and the first light permeable portion. The detecting light is projected downwards onto the barcode sheet and generates a reflected light. The reflected light passes through the first light permeable portion and the first reception guiding rod and is projected upwards onto the first detecting light receiver.

In an example, the second detecting light transmitter emits a detecting light towards the second transmission guiding rod and the second light permeable portion. The detecting light is projected upwards onto the barcode sheet and generates a reflected light. The reflected light passes through the second light permeable portion and the second reception guiding rod and is projected downwards onto the second detecting light receiver.

In an example, the bottom side of the first lens has a first light impermeable portion surrounding the first light permeable portion, and the top side of the second lens has a second light impermeable portion surrounding the second light permeable portion.

In an example, the each of the first light impermeable portion and the second light impermeable portion is a black printing side.

In an example, each of the first transmission guiding rod and the second transmission guiding rod has a diameter that gradually decreases from an end thereof towards another end thereof.

The present invention will become clearer in light of the following detailed description of illustrative embodiments of this invention described in connection with the drawings.

DETAILED DESCRIPTION OF THE INVENTION

Figure 1:
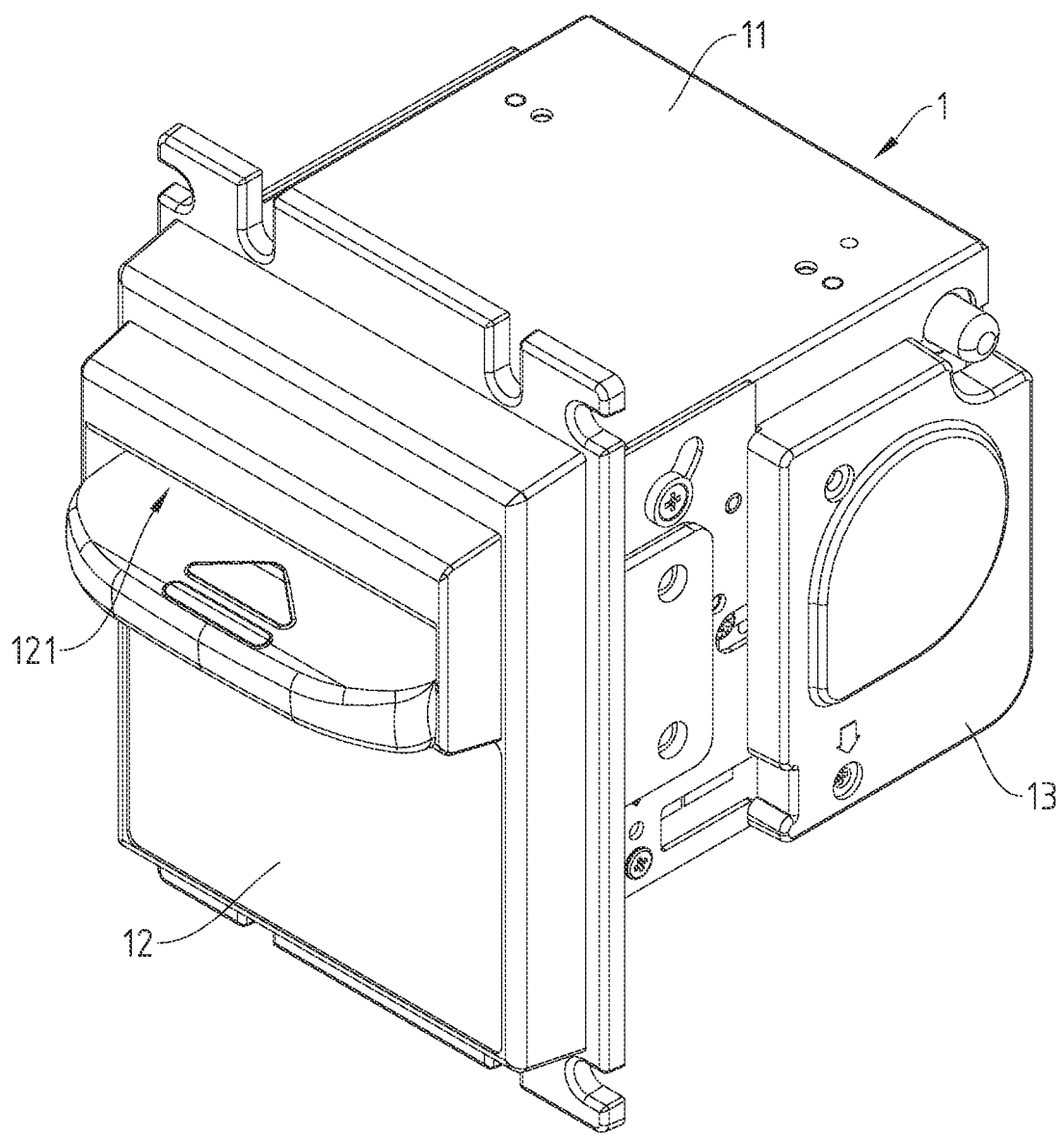
FIG. 1 is a perspective view of a counterfeit paper currency detector according to the present invention.

With reference to FIGS. 1-8, a counterfeit paper currency detector with a barcode reading function according to the present invention includes a casing unit 1, a delivering device 2, a driving device 3, a paper currency detection device 4, and a barcode reading device 5. The delivering device 2, the driving device 3, the paper currency detection device 4, and the barcode reading device 5 are received in the casing unit 1.

The casing unit 1 includes a casing 11, a front panel 12, and a side cover 13. The front panel 12 includes a paper currency inlet 121 intercommunicating with an interior space of the front panel 12.

Figure 4A:
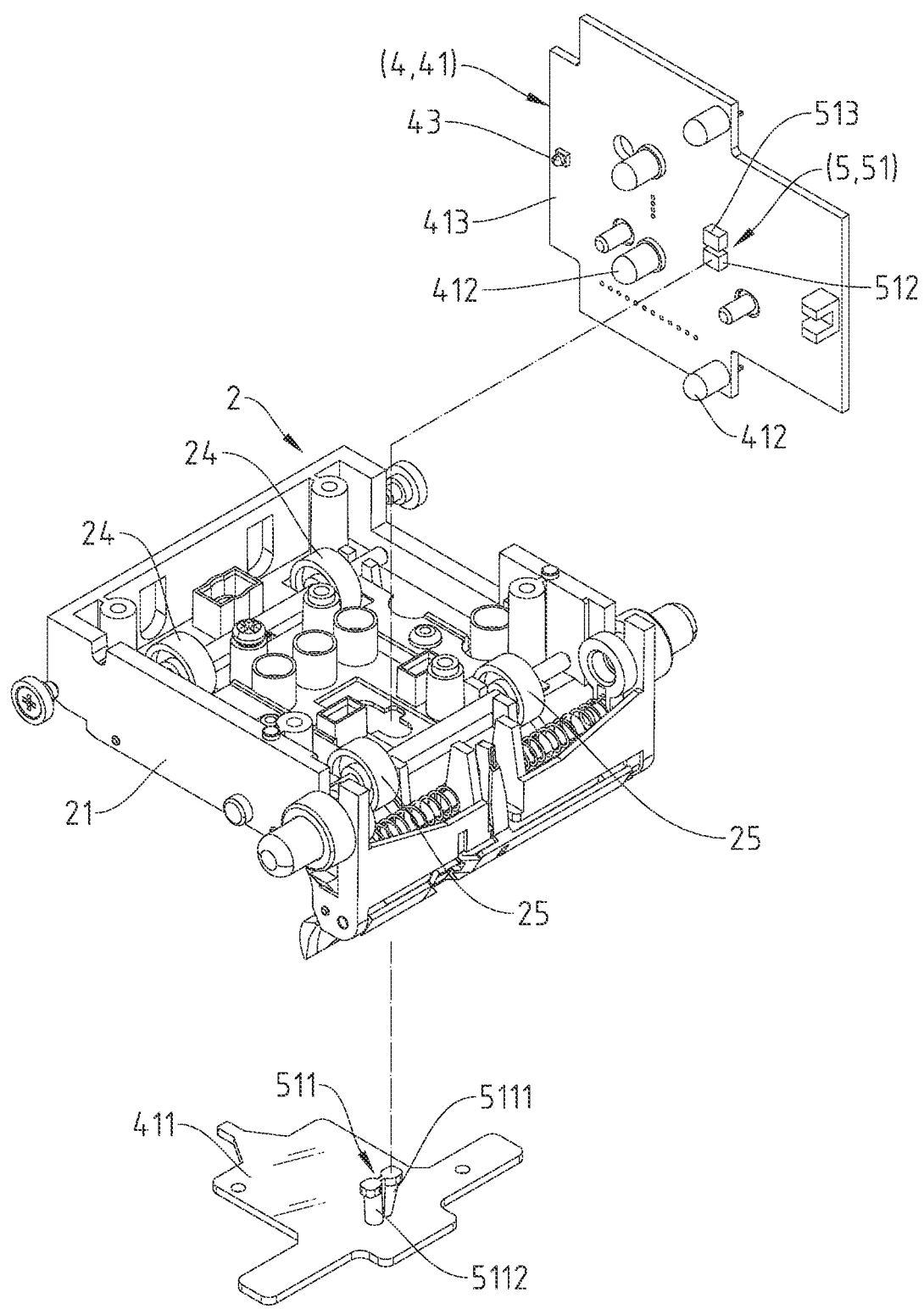
FIG. 4A is an exploded, perspective view of an upper base, a first paper currency detection module, and a first reading module of the counterfeit paper currency detector of FIG. 1.
Figure 4B:
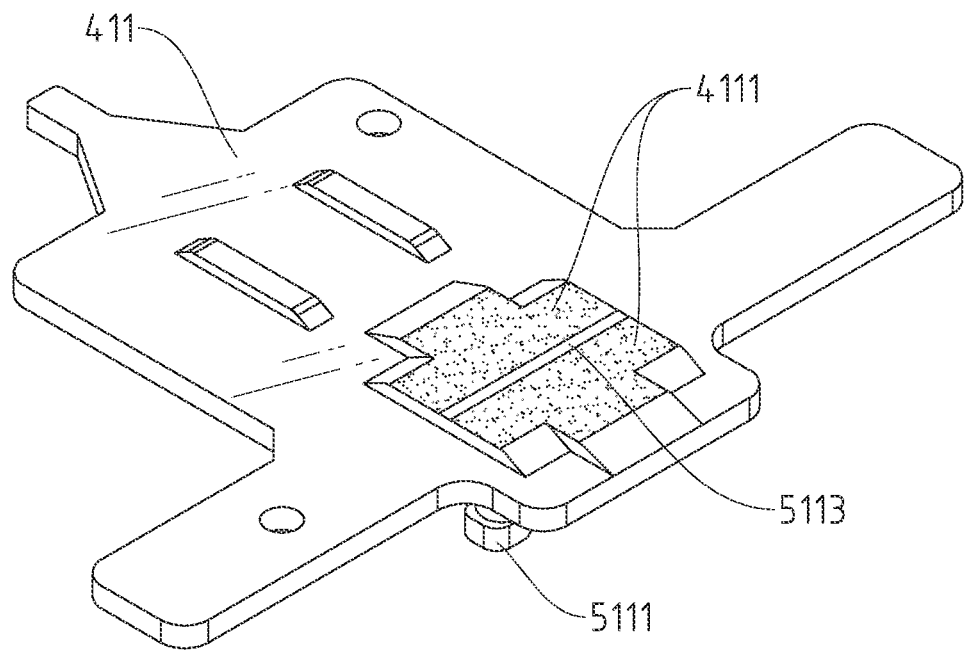
FIG. 4B is a bottom, perspective view of a first lens of the counterfeit paper currency detector of FIG. 1.

The delivering device 2 includes an upper base 21 and a lower base 22. A passageway 23 is defined between the upper base 21 and the lower base 22. Front rollers 24 and rear rollers 25 are mounted on the upper base 21 and are aligned with the passageway 23, as shown in FIGS. 4A and 7.

Figure 2:
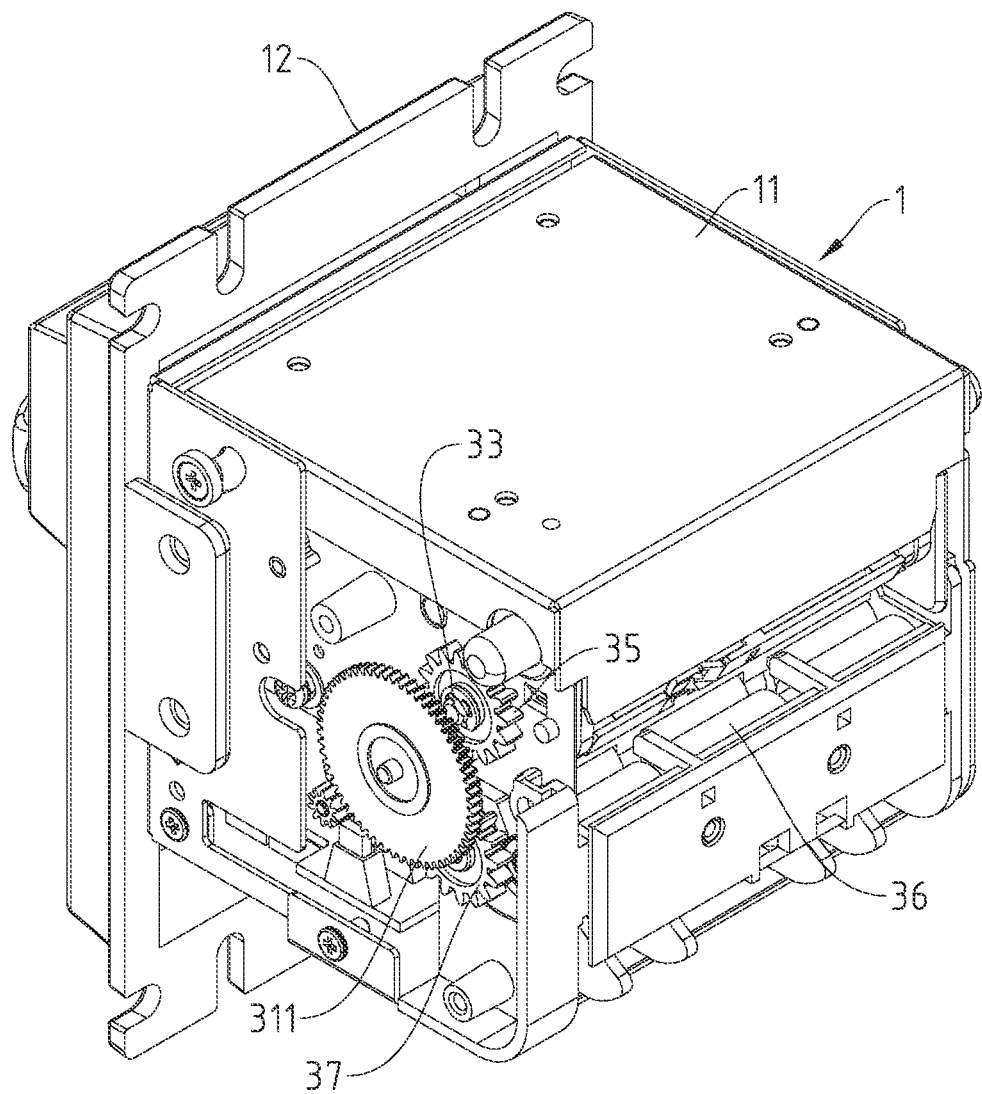
FIG. 2 is a perspective view of the counterfeit paper currency detector of FIG. 1 with a side cover detached.
Figure 3:
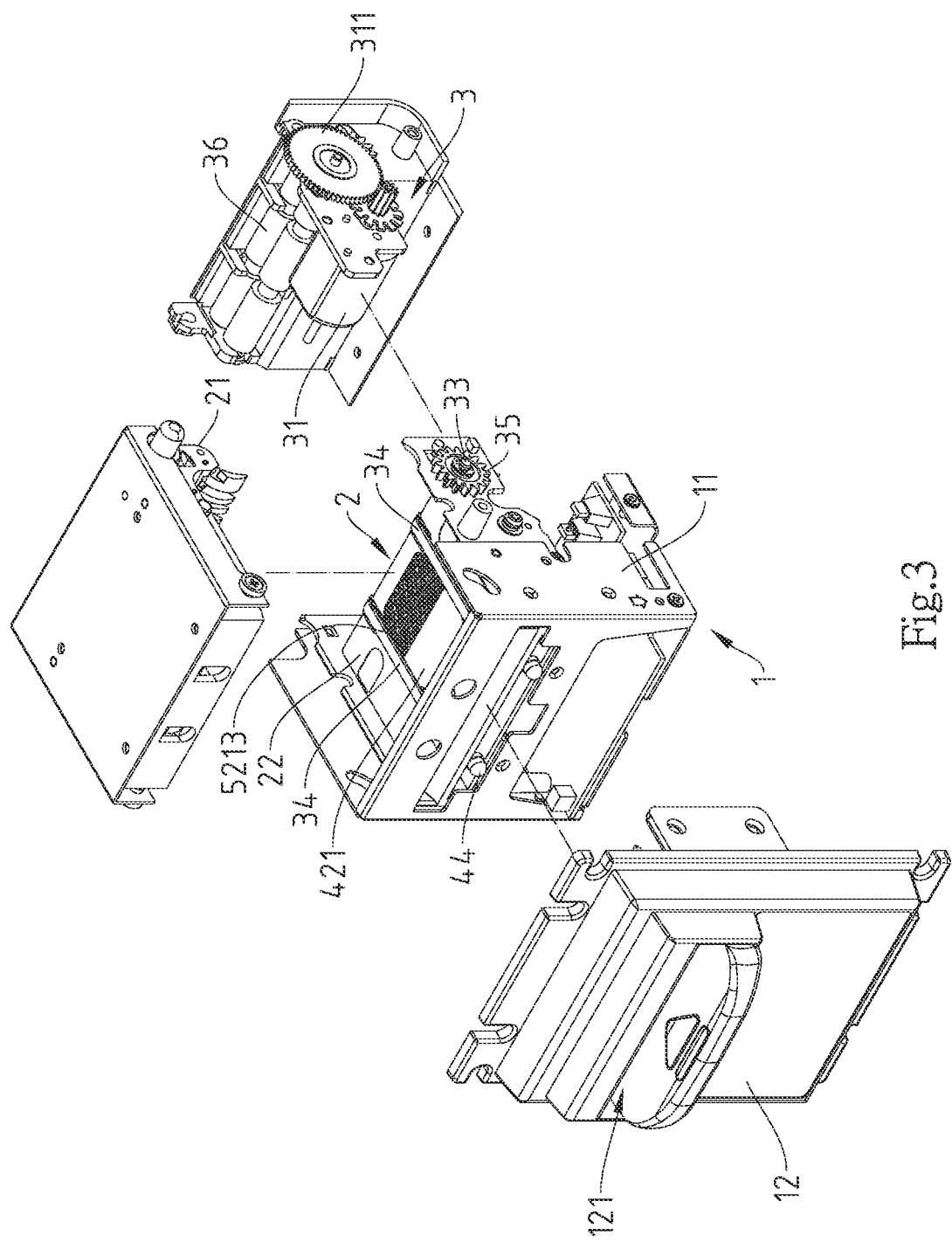
FIG. 3 is an exploded, perspective view of main components of the counterfeit paper currency detector of FIG. 1.
Figure 6:
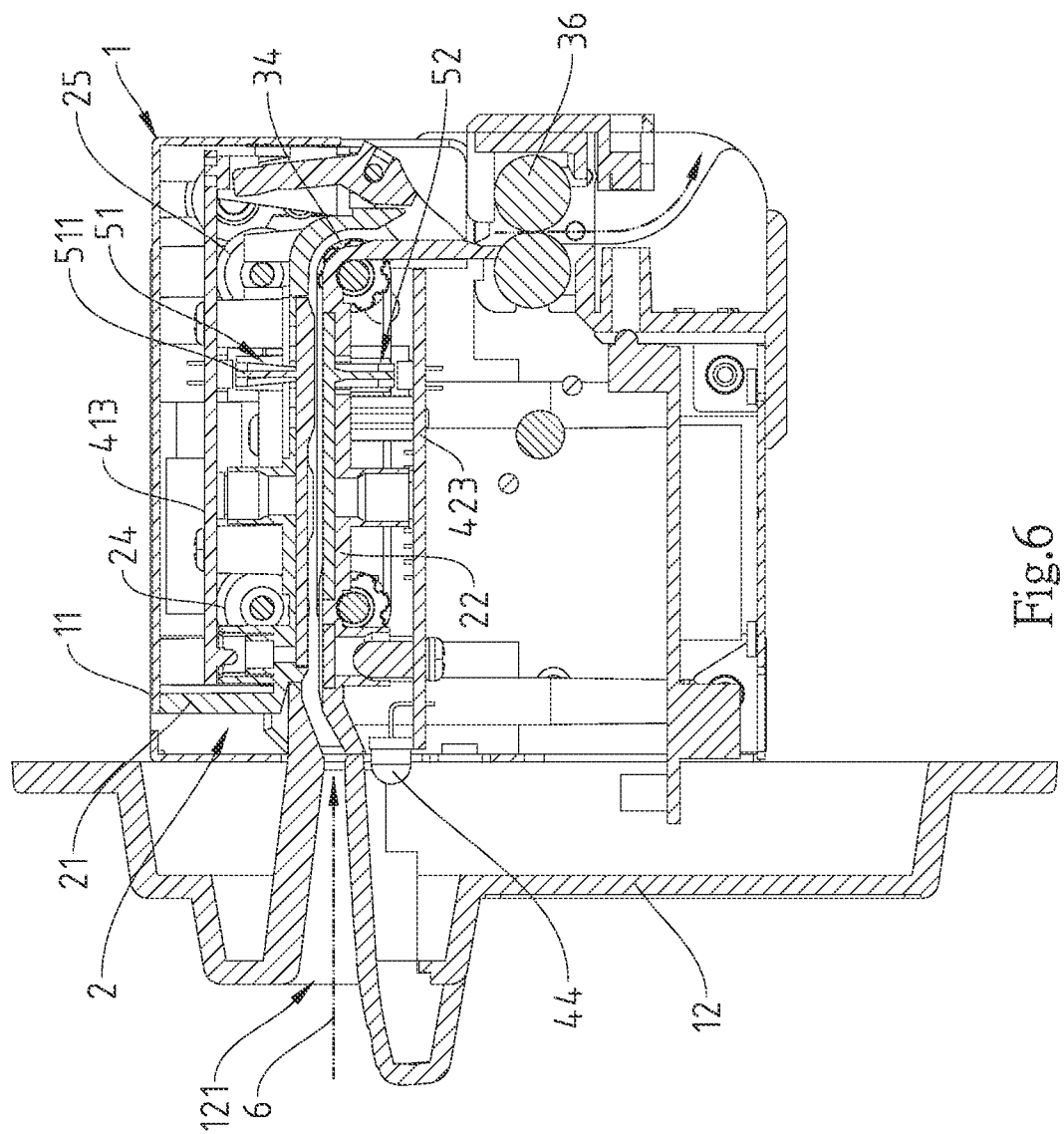
FIG. 6 is a cross sectional view of the counterfeit paper currency detector of FIG. 1, illustrating a delivering direction of a paper currency.
Figure 7:
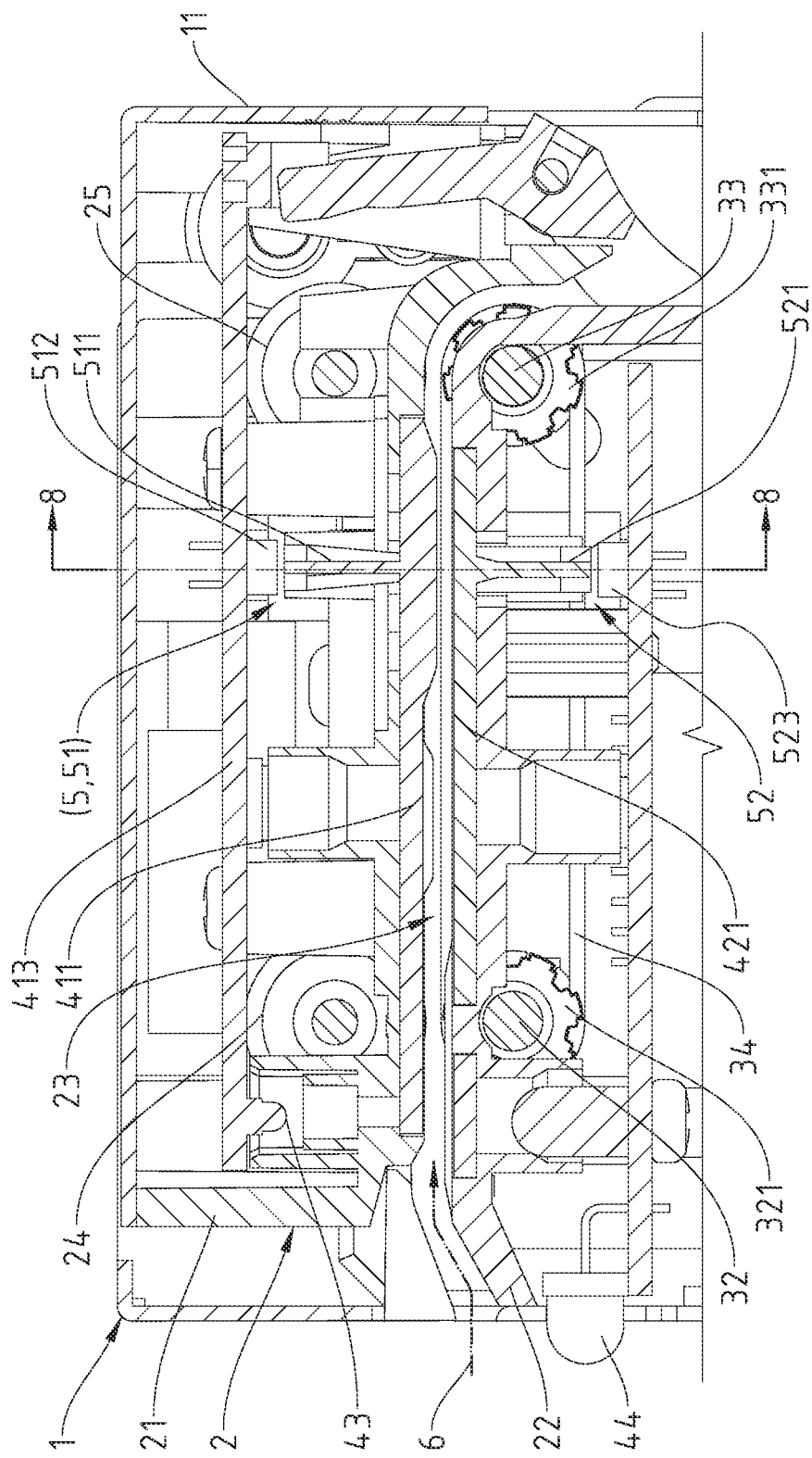
FIG. 7 is an enlarged view of a casing, a delivering device, a paper currency detection device, and a barcode reading device of FIG. 6.

The driving device 3 has a driving member 31 received in the casing 11, as shown in FIGS. 2, 3, and 7. A front shaft 32 and a rear shaft 33 are rotatably mounted to the lower base 22. The driving member 31 drives the rear shaft 33 and a gears 35 via a gear unit 311 and drives a roller unit 36 and a gear 37. The front shaft 32 and the rear shaft 33 drive two transmission belts 34 via two front wheels 321 and two rear wheels 331, thereby driving a paper currency 6 (FIG. 6) or a barcode sheet 7 to pass through the paper currency inlet 121 and the passageway 23.

The paper currency detection device 4 includes a first paper currency detection module 41 and a second paper currency detection module 42, as show from FIG. 4A to FIG. 8. The first paper currency detection module 41 includes a first lens 411 disposed on a bottom side of the upper base 21 and a plurality of first paper currency detection units 412 disposed in the upper base 21. Each of the plurality of first paper currency detection units 412 extends downwards towards the first lens 411 and the passageway 23. The plurality of first paper currency detection units 412 is electrically connected to a first circuit board 413. A detector 43 (FIG. 4A and FIG. 7) is disposed on a front end of the circuit board 413 and is configured to detect entrance of the paper currency 6 or the barcode sheet 7.

The second paper currency detection module 42 includes a second lens 421 disposed on a top side of the lower base 22 and a plurality of second paper currency detection units 422 disposed in the lower base 22. Each of the plurality of second paper currency detection units 422 extends upwards towards the second lens 421 and the passageway 23. The plurality of second paper currency detection units 422 is electrically connected to a second circuit board 423. Lighting members 44 (FIG. 3 and FIG. 5A) are disposed on the second circuit board 423 for illustrating an area below the paper currency inlet 121.

The barcode reading device 5 includes a first reading module 51 and a second reading module 52, as shown from FIG. 4A to FIG. 8. The first reading module 51 includes a V-shaped first light guiding member 511, a first detecting light transmitter 512, and a first detecting light receiver 513. The first light guiding member 511 includes a first transmission guiding rod 5111 and a first reception guiding rod 5112 which are adjacent and at an angle to each other. Each of the first transmission guiding rod 5111 and the first reception guiding rod 5112 has an end integrally connected to a top side of the first lens 411. A first light permeable portion 5113 (FIG. 4B) is disposed to a bottom side of the first lens 411 and is rectilinear. The bottom side of the first lens 411 is a black printing side surrounding the first light permeable portion 5113, thereby forming a first light impermeable portion 4111. The first detecting light transmitter 512 and the first detecting light receiver 513 are electrically connected to the first circuit board 413. The first detecting light transmitter 512 and the first detecting light receiver 513 face another ends of the first transmission guiding rod 5111 and the first reception guiding rod 5112. The first transmission guiding rod 5111 has a diameter that gradually decreases from an end thereof towards another end thereof for gathering the detecting light.

The second reading module 52 includes a V-shaped second light guiding member 521, a second detecting light transmitter 522, and a second detecting light receiver 523. The second light guiding member 521 includes a second transmission guiding rod 5211 and a second reception guiding rod 5212 which are adjacent and at an angle to each other. Each of the second transmission guiding rod 5211 and the second reception guiding rod 5212 has an end integrally connected to a bottom side of the second lens 421. A second light permeable portion 5213 (FIG. 3 and FIG. 5B) is disposed to a top side of the second lens 421 and is rectilinear. The top side of the second lens 421 is a black printing side surrounding the second light permeable portion 5213, thereby forming a second light impermeable portion 4211. The second detecting light transmitter 522 and the second detecting light receiver 523 are electrically connected to the second circuit board 423. The second detecting light transmitter 522 and the second detecting light receiver 523 face another ends of the second transmission guiding rod 5211 and the second reception guiding rod 5212. The second transmission guiding rod 5211 has a diameter that gradually decreases from an end thereof towards another end thereof for gathering the detecting light.

Figure 8:
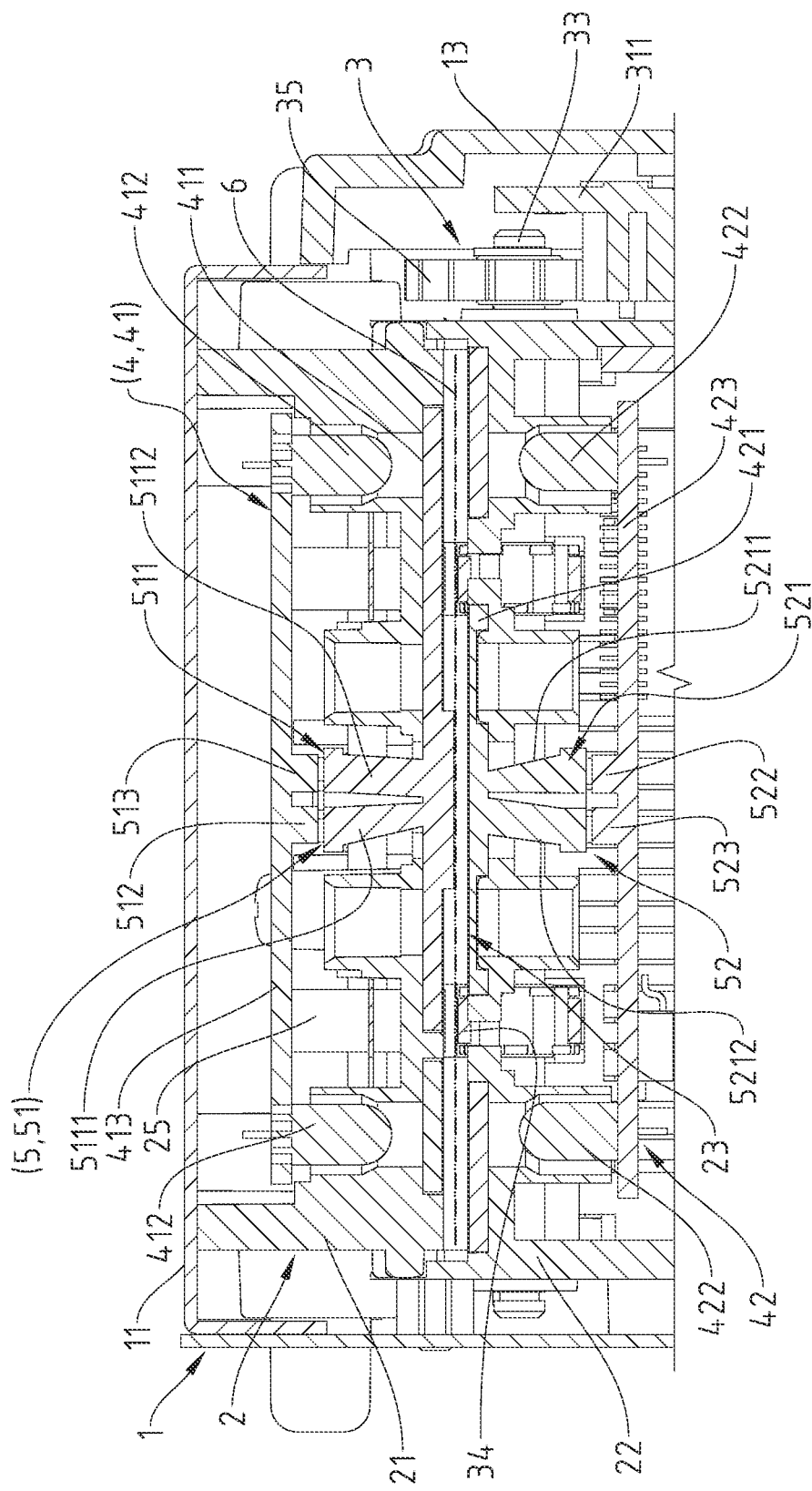
FIG. 8 is a cross sectional view taken along section line 8-8 of FIG. 7.

The detector 43 detects whether a paper currency 6 or a barcode sheet 7 is inserted into the counterfeit paper currency detector. With reference to FIGS. 6-8, in a case in which the detector 43 detects a paper currency 6 enters via the paper currency inlet 121 of the front panel 12, the driving device 3 drives the paper currency 6 to pass through the passageway 23 via the delivering device 2. At the same time, each of the first paper currency detection units 412 projects a detecting light downwardly onto the paper currency 6, whereas each of the second paper currency detection units 422 projects a detecting light upwards onto the paper currency 6, thereby examining whether the paper currency 6 is genuine. The paper currency examination and its technology are well known in the art and, therefore, not described in detail. The barcode reading device 5 does not obtain any barcode information after carrying out barcode reading/decoding simultaneous to operation of the counterfeit paper currency detection device 4.

Figure 9:
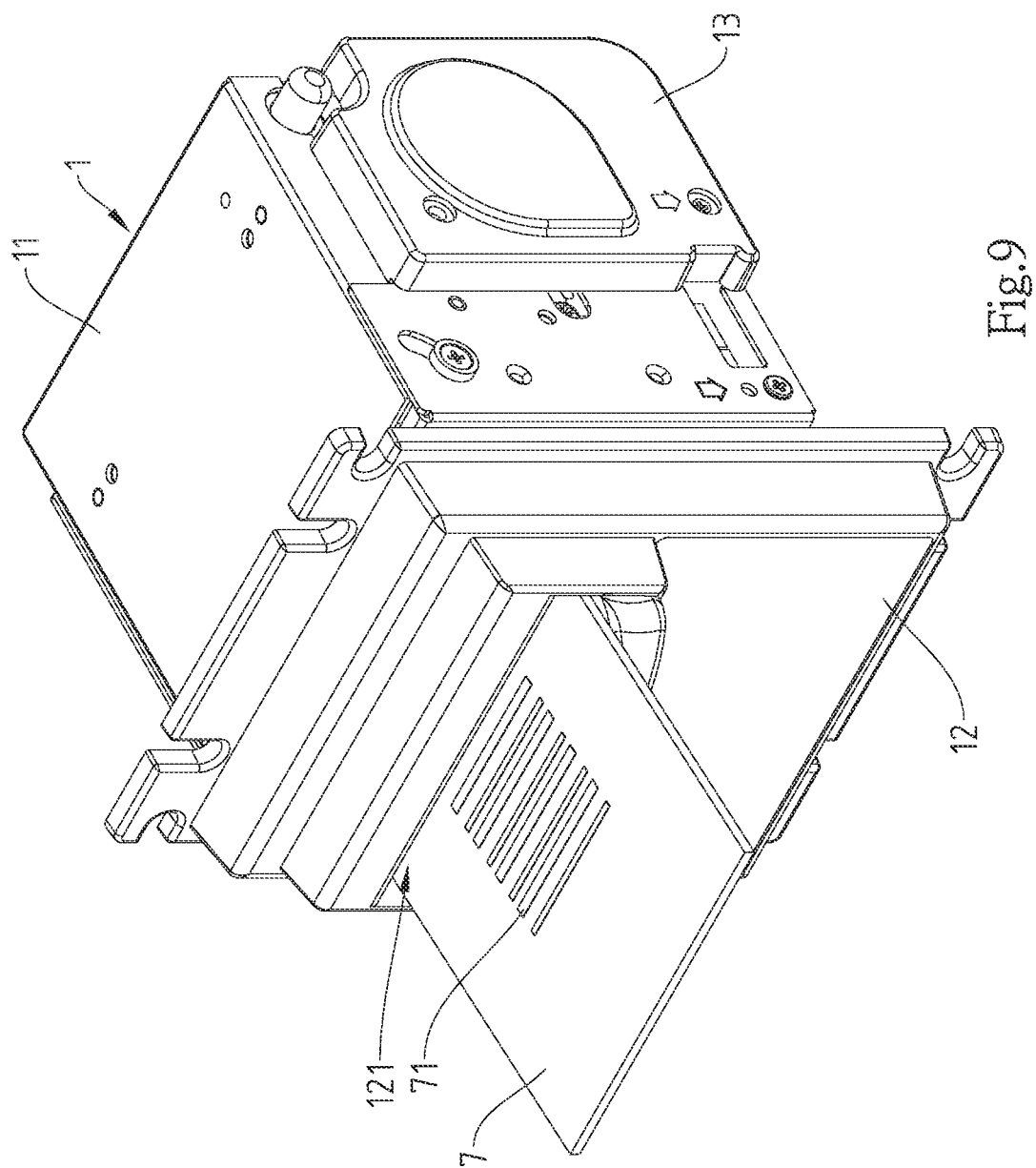
FIG. 9 is a diagrammatic perspective view illustrating insertion of a barcode sheet into the counterfeit paper currency detector of FIG. 1.
Figure 10:
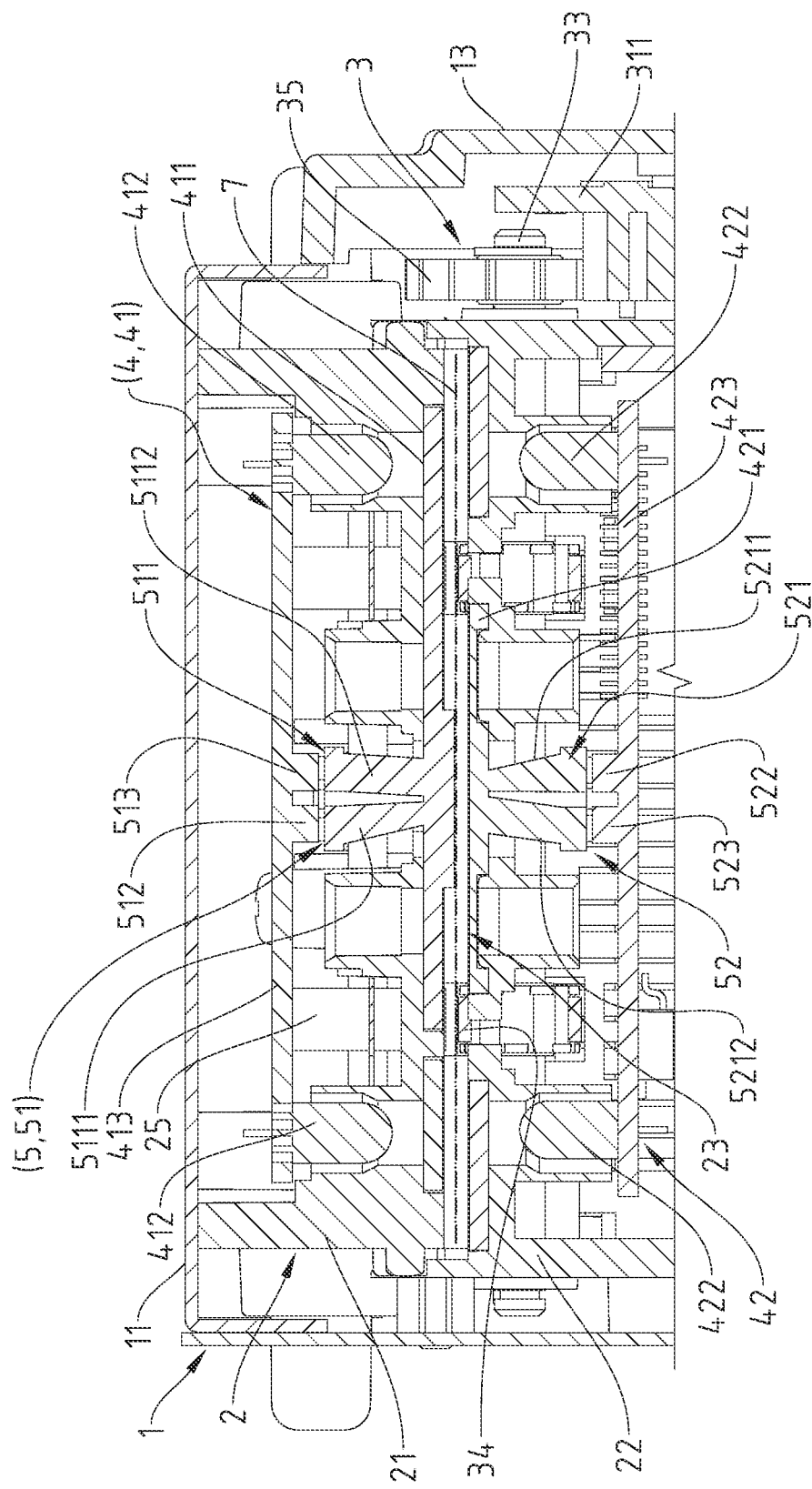
FIG. 10 is an enlarged, cross-sectional view of the counterfeit paper currency detector of FIG. 1, illustrating reading of the barcode sheet.

With reference to FIGS. 9 and 10, in another case in which the detector 43 detects a barcode sheet 7 enters via the paper currency inlet 121 of the front panel 12, the driving device 3 drives the barcode sheet 7 to pass through the passageway 23 via the delivering device 2. At the same time, the first detecting light transmitter 512 emits a detecting light towards the first transmission guiding rod 5111 and the first light permeable portion 5113 (see FIG. 4B). The detecting light is projected downwards onto the barcode sheet 7 and generates a reflected light. The reflected light passes through the first light permeable portion 5113 and the first reception guiding rod 5112 and is projected upwards onto the first detecting light receiver 513. The paper currency detection device 4 does not obtain any information of a genuine paper currency after carrying out paper currency examination simultaneous to operation of the barcode reading device 5.

Figure 5A:
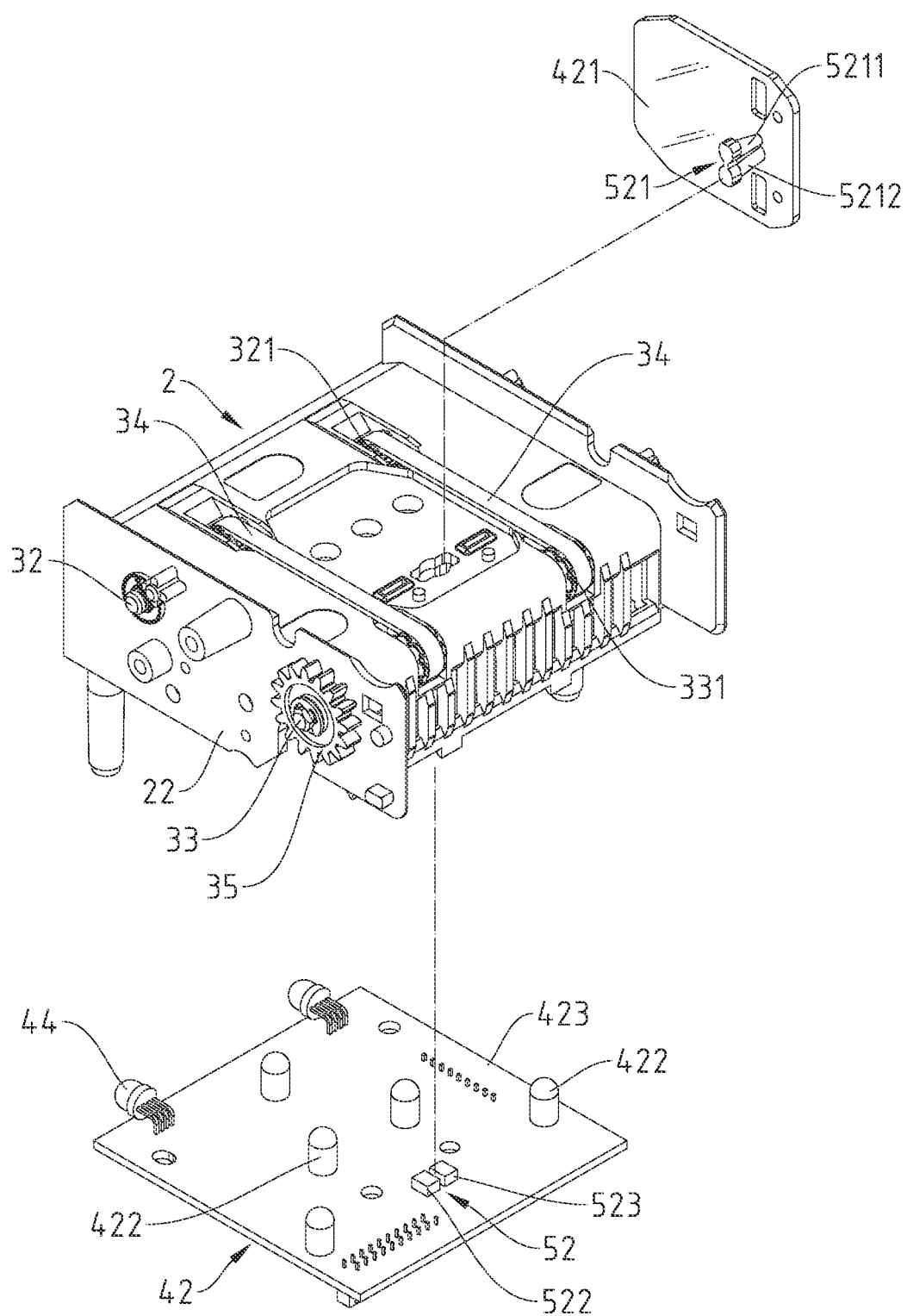
FIG. 5A is an exploded, perspective view of a lower base, a second paper currency detection module, and a second reading module of the counterfeit paper currency detector of FIG. 1.
Figure 5B:
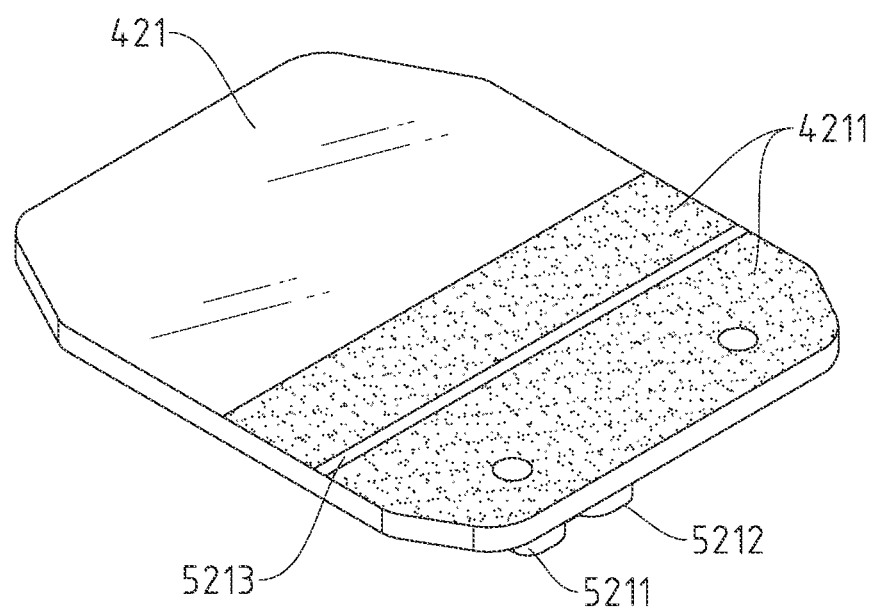
FIG. 5B is a top, perspective view of a second lens of the counterfeit paper currency detector of FIG. 1.

Furthermore, the second detecting light transmitter 522 emits a detecting light towards the second transmission guiding rod 5211 and the second light permeable portion 5213 (see FIG. 5B). The detecting light is projected upwards onto the barcode sheet 7 and generates a reflected light. The reflected light passes through the second light permeable portion 5213 and the second reception guiding rod 5212 and is projected downwards onto the second detecting light receiver 523.

Furthermore, the first light permeable portion 5113, the second light permeable portion 5213, and a plurality of bars 71 (FIG. 9) on the barcode sheet 7 are perpendicular to a moving direction of the barcode sheet 7. While the barcode sheet 7 is passing through the passageway 23, in a case that the plurality of bars 71 on the barcode sheet 7 faces upwards, the first reading module 51 reads a width of each of the plurality of bars 71 and a space between each two adjacent bars 71. A conventional decoding technology can be used to obtain the information represented by the one-dimensional barcode. In another case the plurality of bars 71 faces downwards, the second reading module 52 reads a width of each of the plurality of bars 71 and a space between each two adjacent bars 71. A conventional decoding technology can be used to obtain the information represented by the one-dimensional barcode.

Although specific embodiments have been illustrated and described, numerous modifications and variations are still possible without departing from the scope of the invention. The scope of the invention is limited by the accompanying claims.

The invention claimed is:

1. A counterfeit paper currency detector with a barcode reading function, comprising:
   a casing unit including a casing and a front panel, wherein the front panel includes a paper currency inlet intercommunicating with an interior space of the front panel;
   a delivering device received in the casing unit and including an upper base and a lower base, wherein a passageway is defined between the upper base and the lower base;
   a driving device received in the casing unit, disposed on the lower base, and configured to drive a paper currency or a barcode sheet to pass through the paper currency inlet and the passageway;
   a paper currency detection device received in the casing unit and including a first paper currency detection module and a second paper currency detection module, wherein the first paper currency detection module includes a first lens disposed on a bottom side of the upper base and a plurality of first paper currency detection units disposed in the upper base, wherein each of the plurality of first paper currency detection units extends downwards towards the first lens and the passageway, wherein the plurality of first paper currency detection units is electrically connected to a first circuit board, wherein the second paper currency detection module includes a second lens disposed on a top side of the lower base and a plurality of second paper currency detection units disposed in the lower base, wherein each of the plurality of second paper currency detection units extends upwards towards the second lens and the passageway, wherein the plurality of second paper currency detection units is electrically connected to a second circuit board, wherein when the paper currency passes through the passageway, each of the first paper currency detection units and each of the second paper currency detection units examine whether the paper currency is genuine; and
   a barcode reading device received in the casing unit and including a first reading module and a second reading module, wherein the first reading module includes a V-shaped first light guiding member, a first detecting light transmitter, and a first detecting light receiver, wherein the first light guiding member includes a first transmission guiding rod and a first reception guiding rod which are adjacent and at an angle to each other, wherein each of the first transmission guiding rod and the first reception guiding rod has an end integrally connected to a top side of the first lens, wherein a first light permeable portion is disposed to a bottom side of the first lens and is rectilinear, wherein the first detecting light transmitter and the first detecting light receiver are electrically connected to the first circuit board, wherein the first detecting light transmitter and the first detecting light receiver face another ends of the first transmission guiding rod and the first reception guiding rod, wherein the second reading module includes a V-shaped second light guiding member, a second detecting light transmitter, and a second detecting light receiver, wherein the second light guiding member includes a second transmission guiding rod and a second reception guiding rod which are adjacent and at an angle to each other, wherein each of the second transmission guiding rod and the second reception guiding rod has an end integrally connected to a bottom side of the second lens, wherein a second light permeable portion is disposed to a top side of the second lens and is rectilinear, wherein the second detecting light transmitter and the second detecting light receiver are electrically connected to the second circuit board, wherein the second detecting light transmitter and the second detecting light receiver face another ends of the second transmission guiding rod and the second reception guiding rod, wherein when the barcode sheet passes through the passageway, the first light permeable portion, the second light permeable portion, and a plurality of bars on the barcode sheet are perpendicular to a moving direction of the barcode sheet, wherein the first reading module or the second reading module reads a width of each of the plurality of bars and a space between each two adjacent bars.

2. The counterfeit paper currency detector with the barcode reading function as claimed in claim 1, wherein the first reading module and the second reading module read two opposite sides of the barcode sheet, respectively.

3. The counterfeit paper currency detector with the barcode reading function as claimed in claim 1, wherein the first detecting light transmitter emits a detecting light towards the first transmission guiding rod and the first light permeable portion, wherein the detecting light is projected downwards onto the barcode sheet and generates a reflected light, wherein the reflected light passes through the first light permeable portion and the first reception guiding rod and is projected upwards onto the first detecting light receiver.

4. The counterfeit paper currency detector with the barcode reading function as claimed in claim 1, wherein the second detecting light transmitter emits a detecting light towards the second transmission guiding rod and the second light permeable portion, wherein the detecting light is projected upwards onto the barcode sheet and generates a reflected light, wherein the reflected light passes through the second light permeable portion and the second reception guiding rod and is projected downwards onto the second detecting light receiver.

5. The counterfeit paper currency detector with the barcode reading function as claimed in claim 1, wherein the bottom side of the first lens has a first light impermeable portion surrounding the first light permeable portion, and wherein the top side of the second lens has a second light impermeable portion surrounding the second light permeable portion.

6. The counterfeit paper currency detector with the barcode reading function as claimed in claim 5, wherein the each of the first light impermeable portion and the second light impermeable portion is a black printing side.

7. The counterfeit paper currency detector with the barcode reading function as claimed in claim 1, wherein each of the first transmission guiding rod and the second transmission guiding rod has a diameter that gradually decreases from an end thereof towards another end thereof.

* * * * *